Figure 1:
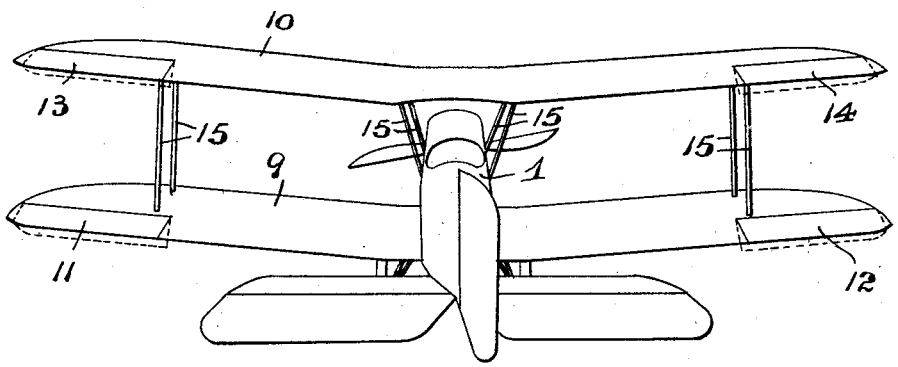

G. D. SIMONDS.
AEROPLANE.
APPLICATION FILED JAN. 8, 1919.

1,403,715.

Patented Jan. 17, 1922.
5 SHEETS—SHEET 1.

INVENTOR:
George D. Simonds,
BY
Fraentzel and Richards,
ATTORNEYS.

G. D. SIMONDS.
AEROPLANE.
APPLICATION FILED JAN. 8, 1919

1,403,715.

Patented Jan. 17, 1922.
5 SHEETS—SHEET 3.

INVENTOR:
George D. Simonds,
BY
Fraentzel and Richards
ATTORNEYS.

UNITED STATES PATENT OFFICE.

GEORGE D. SIMONDS, OF NEWARK, NEW JERSEY.

AEROPLANE.

1,403,715.  Specification of Letters Patent.  Patented Jan. 17, 1922.

Application filed January 8, 1919. Serial No. 270,123.

*To all whom it may concern:*

Be it known that I, GEORGE D. SIMONDS, a citizen of the United States, residing at Newark, in the county of Essex and State of New Jersey, have invented certain new and useful Improvements in Aeroplanes; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in aeroplanes; and, the said invention has reference, more particularly, to the provision of a plane or planes of the flying machine with a novel arrangement of ailerons and a novel mechanism for operating and setting the respective ailerons at the ends of a plane angularly with the opposite faces of a plane, thus working the ailerons under flying conditions against existing air-currents, and also for operating and setting the respective ailerons at the ends of the plane angularly with lower face of the plane, so as to increase the angle of incidence of the plane in rising and landing, or in the air as the pilot may desire.

The present invention, therefore, has for its principal object to provide a novel aileron-manipulating mechanism for the purposes above stated, and more especially a mechanism for producing an angular disposition of the respective ailerons which increases or tends to increase the angle of incidence of the wings or planes and thereby facilitates a more flexible maneuvering of the aeroplane or flying machine in rising from and landing upon the ground, in some cases, while flying in the air, as may be desired by the pilot.

Other objects of this invention not at this time more particularly enumerated will be clearly understood from the following detailed description of the present invention.

With the various objects of the present invention in view, the said invention consists, primarily, in the novel aeroplane or flying machine hereinafter set forth; and, the said invention consists, furthermore, in the novel arrangements and combinations of the various devices and parts, as well as in the details of construction of the said parts, for accomplishing the above-stated results, and all of which will be more fully described in the following specification, and then finally embodied in the clauses of the claims which are appended to and which form an essential part of the said specification.

The invention is clearly illustrated in the accompanying drawings, in which:—

Figure 1 shows in perspective view an aeroplane or flying machine, looking at the rear end of the same, and illustrating in connection with the ends of the wings or planes of the machine, diagrammatically, an arrangement of the ailerons, the angular arrangement of the latter for increasing the angle of incidence, when rising or landing, being indicated in dotted outline, the mechanism, however, for operating the ailerons being omitted in this view.

Figure 2:
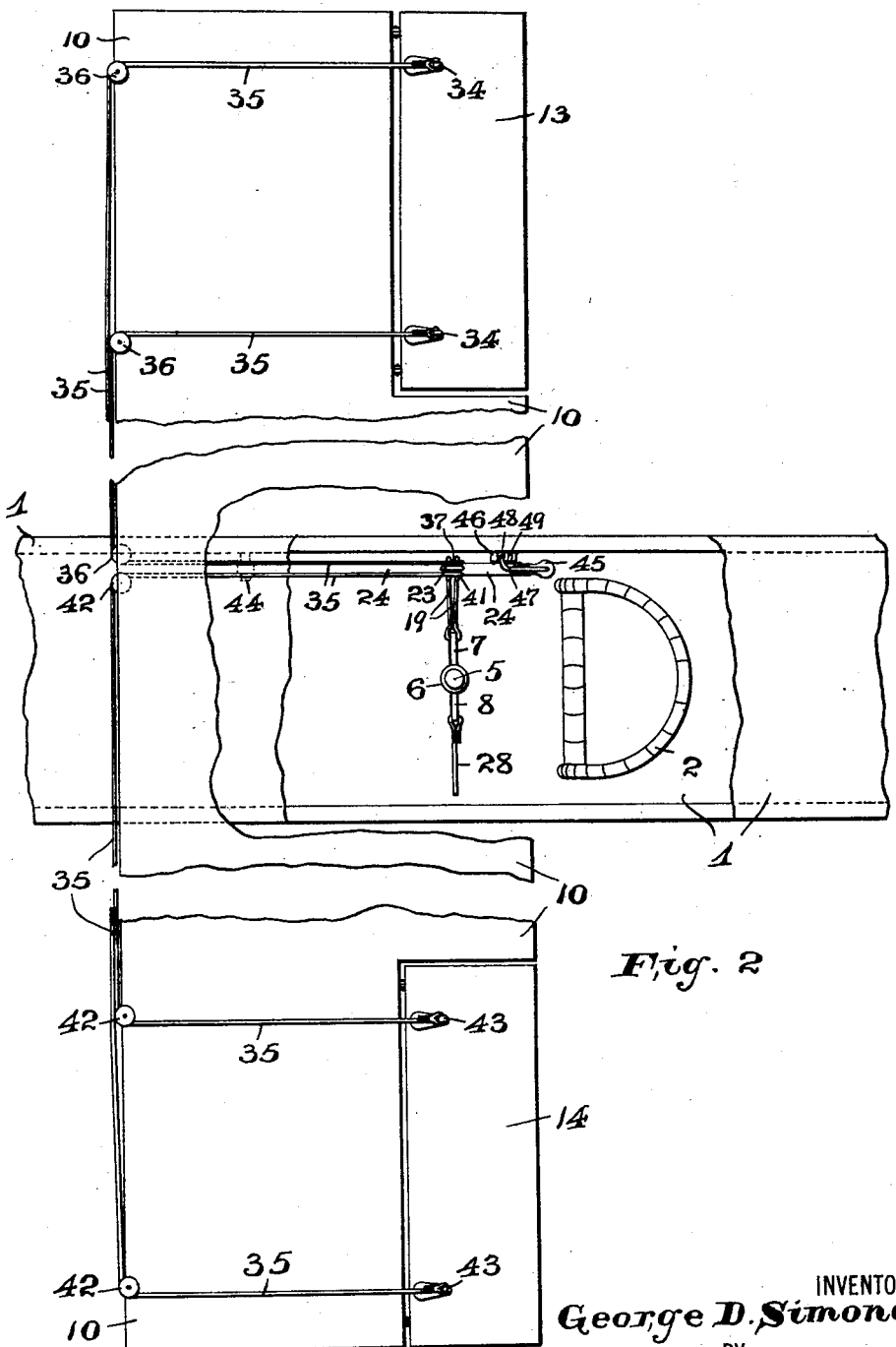

Figure 2 shows in plan view portions of the main body of the aeroplane or flying machine, and of one of its main planes or wings, with the end-ailerons thereof, and the means for operating the ailerons for the purposes heretofore stated.

Figure 3:
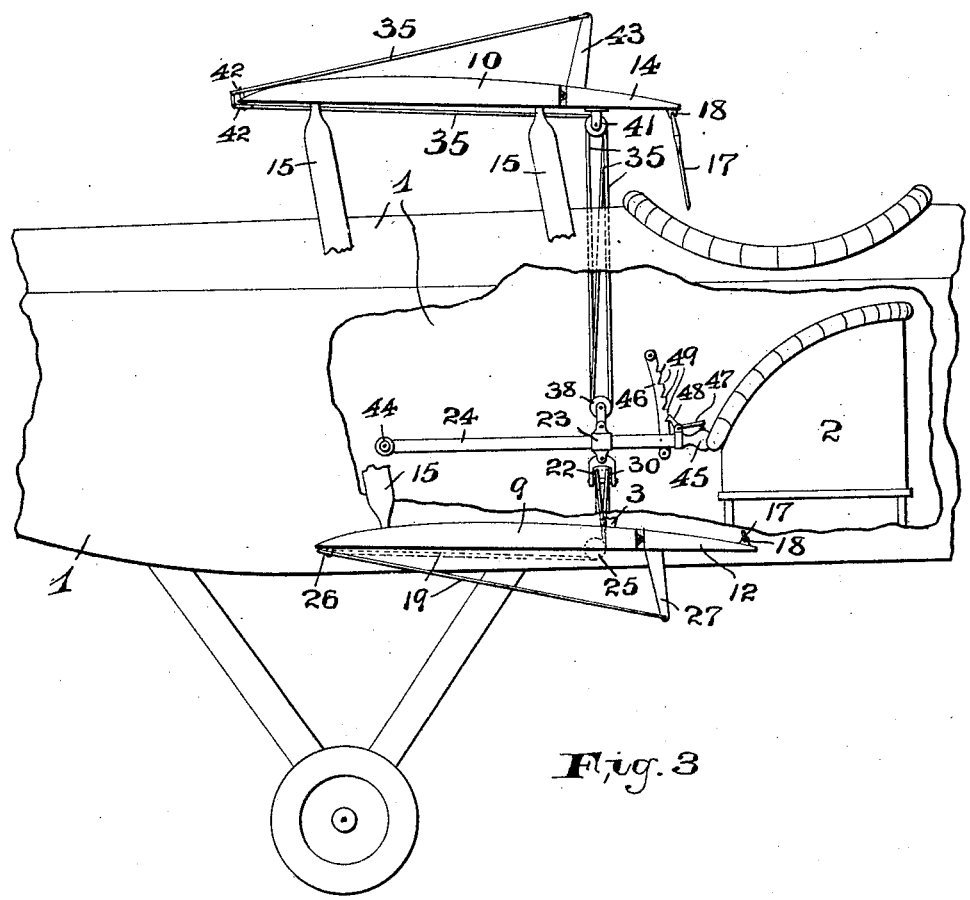

Figure 3 also is a view of a fragmentary portion of the main body of the aeroplane or flying machine, in side elevation with part of said body represented as being broken away.

Figure 4:
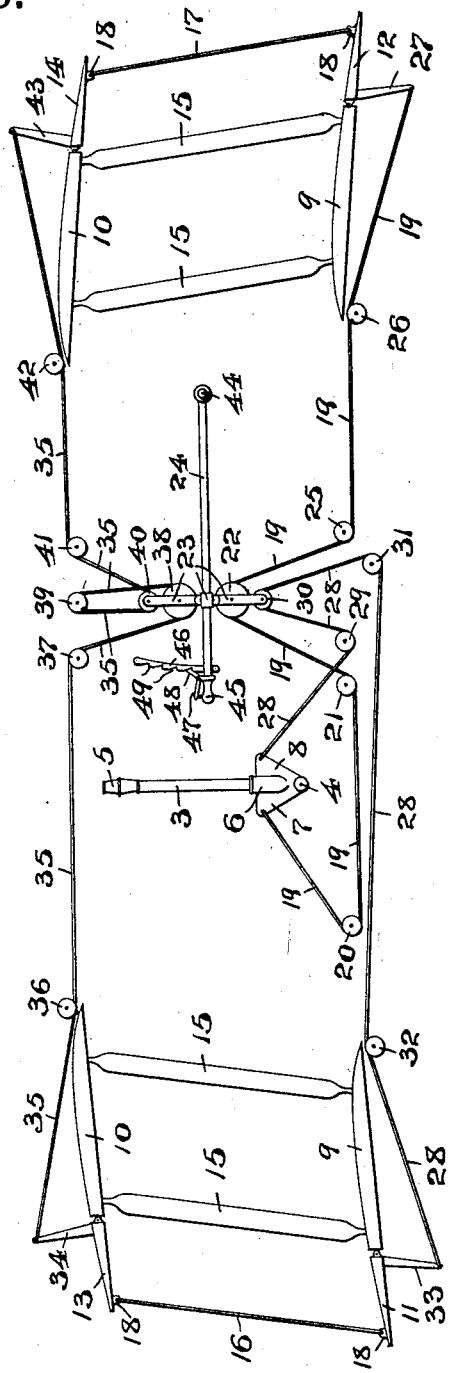
Figure 5:
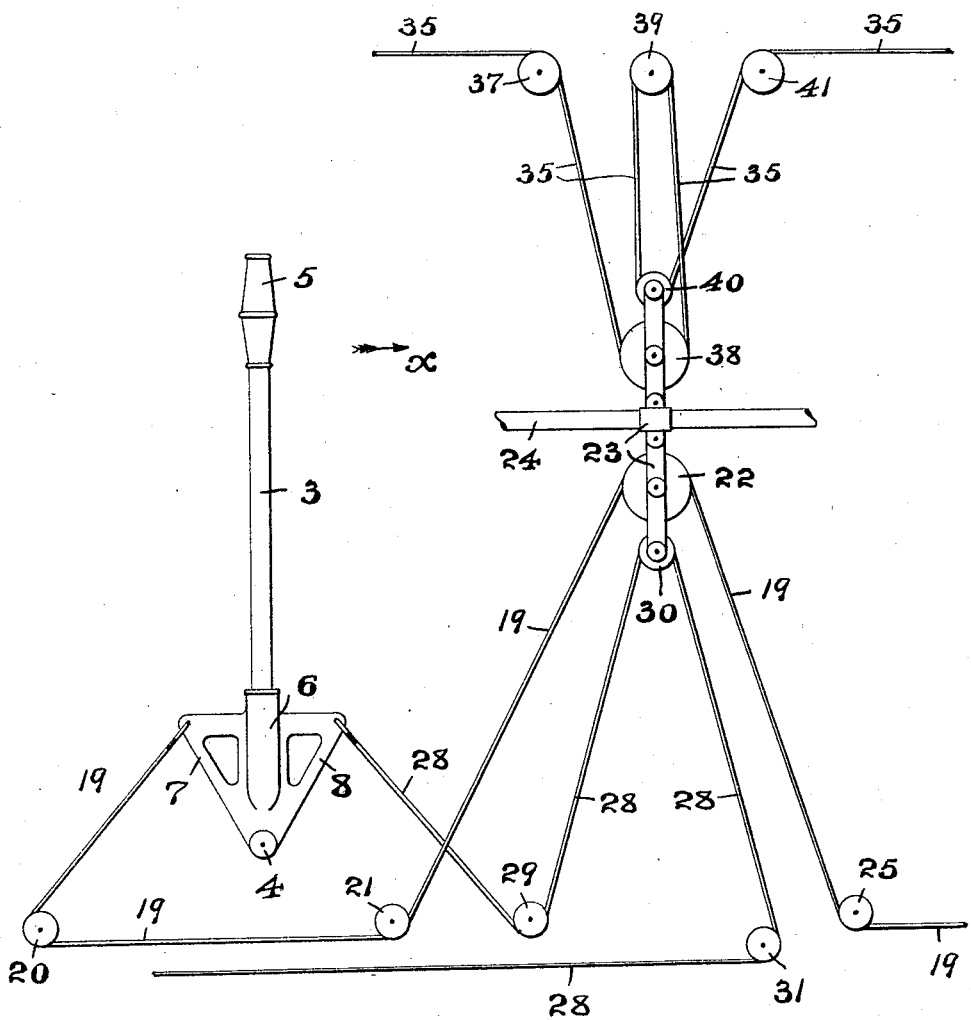

Figure 4 is a distortive view, showing diagrammatically, an arrangement of a pair of main planes or wings, and the hinged ailerons at their respective ends, with one arrangement of the means for operating and setting the said ailerons, and Figure 5 is an enlarged view, showing in detail and in side view, the control-stick, a portion of the pivoted lever for raising and lowering the cables which lead to the ailerons, and diagrammatically an arrangement of pulleys or grooved wheels, over which the said cables pass.

Similar characters of reference are employed in all of the said above described views, to indicate corresponding parts.

Referring now to the said figures of the drawings, the reference-character 1 indicates a fragmentary portion of the main body of an aeroplane or flying machine, and 2 indicates the seat within said body, for the pilot of the machine. The reference-character 3 indicates the control-stick, which is suitably pivoted, as at 4, see Figures 4 and 5 of the drawings, the said control-stick being preferably arranged in such a manner, so as to be capable of oscillatory movement laterally with relation to the body of the aeroplane, as will be evident from an inspection of Figure 2 of the drawings. The said control-stick is made with a handle or gripping member 5, and its lower portion is formed with the socket-member 6 provided with projecting members or extensions 7 and 8.

It will be understood, however, that the said control-stick may be otherwise constructed and arranged, or other suitably constructed means may be provided for operating the aileron-controlling cables, as will hereinafter more fully appear.

The aeroplane or flying machine, in this case, is shown provided with two main planes 9 and 10, the lower plane 9 being provided at its respective ends with the respective ailerons 11 and 12, and the upper plane 10 being likewise provided at its respective ends with the respective ailerons 13 and 14, which are suitably hinged to said main planes in the usual manner. The two main planes are suitably connected by means of any usual struts, or uprights or posts 15, and the oppositely located ailerons 11 and 13, and 12 and 14, are connected by means of connecting cables or rods 16 and 17, having their respective end-portions operatively connected with the respective ailerons, by means of suitably constructed eye-plates 18, or the like, so as not to interfere with the movements of the said ailerons when operating the same.

Suitably attached to the projecting member or extension 7 of the control-stick 3 the end of a cable 19, said cable passing over an arrangement of pulleys or grooved wheels 20 and 21, which are suitably disposed and mounted upon the frame-work of the aeroplane, said cable passing in an upward direction over a pulley or grooved wheel 22 mounted in a suitable frame or holder, as 23, suitably secured to the shifting lever 24, to be presently described. From said pulley 22, the said cable 19 passes in a downward direction, over another pair of pulleys or grooved wheels 25 and 26, being finally attached at its other end to an arm or post 27 which extends in a downward direction from the aileron 12.

In a like manner, there is attached to the projecting member or extension 8 of the control-stick 3, the end of another cable 28, said cable passing over an arrangement of pulleys or grooved wheels 29 and 30, respectively mounted upon the framework of the aeroplane and in the frame or holder 23 of the lever 24, said cable 28 passing in a downward direction over another pair of pulleys or grooved wheels 31 and 32, being finally attached at its other end to an arm or post 33 which extends in a downward direction from the aileron 11.

Extending in an upward direction from the aileron 13 is an arm or post 34 to which is attached one end of a cable 35, said cable passing over a pair of pulleys or grooved wheels 36 and 37 suitably disposed and mounted upon the framework of the aeroplane or flying machine, the cable passing from the pulley 37 in a downward direction over and around a pulley or grooved wheel 38 which is mounted in the frame or holder 23 of the lever 24. From this last-mentioned pulley 38, the cable 35 passes in an upward direction over and around a pulley or grooved wheel 39 mounted upon the framework of the aeroplane or flying machine and then in a downward direction over and around a pulley or grooved wheel 40 also mounted in the frame or holder 23 of the lever 24. From this pulley or grooved wheel 40, the said cable 35 passes in an upward direction, over another pair of pulleys or grooved wheels 41 and 42, the end of the cable 28 being finally attached to an arm or post 43 which extends in an upward direction from the aileron 13.

Referring now more particularly to the shift-lever 24 it will be seen that the latter extends horizontally, and preferably longitudinally with relation to the main body of the aeroplane or flying machine, said lever being pivotally secured at its one end, as at 44, to the framework of the aeroplane, and being formed upon its other end with a handle or gripping member 45. Suitably secured upon the side of the body 1, and within the same, is a toothed sector, as 46, against which the front end-portion of the said lever 24 slides, said lever having pivotally connected therewith, in the usual manner, a ratchet-dog 47 of any usual construction, the ratchet-tooth 48 of which can be brought into holding engagement with any one of the notches or ratchets 49 of said sector 46, as will be clearly evident.

Having in the foregoing described one arrangement of devices and parts for producing the herein-before stated objects of my present invention, I will now briefly set forth the operations of the said mechanism for setting the respective ailerons angularly on opposite sides of the main planes or wings, that is, the aileron at one end of the plane extending in a downward direction and the aileron at the other end of the plane extending in an upward direction, when working the ailerons under flying conditions, by means of the control-stick 3; or, when setting each pair of ailerons angularly to the same side or face of a main plane or wing so as to increase the angle of incidence of the planes or wings when rising or landing, or when flying in the air as desired by the pilot.

To set the various ailerons, at the respective ends of the main planes or wings, angularly to the opposite sides or faces of each plane or wing, when working under flying conditions in the air, the control-stick 3 is pulled in the direction of the arrow X, or toward the right hand side of the body of the machine. This movement exerts a pull upon the cable 19, so that the aileron 12 moves in a downward direction, so as to be set at the desired angle to the lower face of the main plane or wing 9. This downward movement of the aileron 12 is communicated to the upper aileron 14 hinged to the main plane or wing 10, through the rod or connection 17, so that the said aileron 14 will also be set at the correspondingly desired angle to the lower face of the said upper plane or wing 10. The movement of the said aileron 14 in a downward direction, exerts a pull upon the cable 35, whereby the aileron 13 is caused to move in an upward direction, so that said aileron 13 will be set at the correspondingly desired angle to the upper face of the said upper plane or wing 10. This upward movement of the aileron 13 is communicated to the lower aileron 11 hinged to the lower main plane or wing 9, through the rod or connection 16, so that the said aileron 11 will be set at the correspondingly desired angle to the upper face of the said lower plane or wing 9, all of which will be clearly understood from an inspection of the several figures of the drawings. When the control-stick is moved in the opposite direction, or toward the left hand side of the body of the machine, the reverse actions take place, so that the various ailerons can be angularly set in directions opposite from those above mentioned, as will be clearly evident.

When it is desired to operate the device, so as to set all of the ailerons angularly to the lower faces of the main planes or wings, thereby increasing the angles of incidence of the said main planes or wings, which will facilitate a more flexible maneuvering of the aeroplane in rising or landing, or in any case in the air as the pilot may desire, the shift-lever 24 is brought into its horizontal position and the control-stick 3 into its vertical position, being the neutral positions of said lever and stick. The shift-lever 24 is now moved in an upward direction, one or more notches, as may be desired. In consequence of such movement, the pulleys or grooved wheels 30, 22, 38, and 40 are moved upwardly the corresponding distance. The upward movements of the pulleys 22 and 30 causes a pull upon the portions of the cables 19 and 28 between said pulleys 22 and 30 and the ailerons 12 and 11, as will be evident. Simultaneously with the corresponding upward movements of the pulleys or wheels 38 and 40, the cable 35 is sufficiently slackened, so that the downward movements of the ailerons 11 and 12 through the rods or connections 16 and 17 will cause the corresponding downward movements of the two upper ailerons 13 and 14, as will be clearly understood.

This causes all the ailerons to be pulled down and set at the desired angles to the lower faces of the main planes or wings 9 and 10, thus increasing the lifting power, or retarding or slowing down the landing effect of the machine.

While the ailerons are thus angularly set, it will still be possible for the operator to move the control-stick to the right or left, if desired, which will bring about the first-above mentioned condition, that is, one set of the ailerons extending upwardly and the other set of ailerons extending downwardly.

Of course it will be understood that some changes may be made in the general arrangements and combinations of the various devices and parts, as well as in the details of the construction of the said parts without departing from the scope of the present invention as set forth in the foregoing specification and as defined in the clauses of the claims which are appended to the said specification. Hence, I do not limit my present invention to the exact arrangements and combinations of the various devices and parts as described in the said specification, nor do I confine myself to the exact details of the construction of the said parts, as illustrated in the accompanying drawings.

I claim:—

1. In an aeroplane, in combination with the frame-work thereof, a pair of main planes, an aileron movably attached at each end-portion of each main plane, tie-rods connecting the ailerons at each end of one main plane with the ailerons at each end of the other main plane, a control-stick and a shift-lever both pivotally mounted upon said frame-work, a series of pulleys mounted upon said frame-work, a set of pulleys connected with said shift-lever, cables passing over the various pulleys, said cables being attached at one end to the control-stick and at their other ends to the respective ailerons at the ends of one of said main planes, a second series of pulleys mounted upon said frame-work, a second set of pulleys connected with said shift-lever, and a cable passing over said second series and said second set of pulleys, said last-mentioned cable being attached at its respective ends to the respective ailerons of the other main plane.

2. In an aeroplane, in combination with the frame-work thereof, a pair of main planes, an aileron movably attached at each end-portion of each main plane, tie-rods connecting the ailerons at each end of one main plane with the ailerons at each end of the other main plane, a control-stick and a shift-lever both pivotally mounted upon said frame-work, a series of pulleys mounted upon said frame-work, a set of pulleys connected with said shift-lever, cables passing over the various pulleys, said cables being attached at one end to the control-stick and at their other ends to the respective ailerons at the ends of one of said main planes, a second series of pulleys mounted upon said frame-work, a second set of pulleys connected with said shift-lever, and a cable passing over said second series and said second set of pulleys, said last-mentioned cable being attached at its respective ends to the respective ailerons of the other main plane, and a ratchet-mechanism for retaining the shift-lever in a raised position and said ailerons angularly set to the lower face of the main plane.

In testimony that I claim the invention set forth above I have hereunto set my hand this 2nd day of January, 1919.

GEORGE D. SIMONDS.

Witnesses:
 FREDK. C. FRAENTZEL,
 GEO. H. SIMONDS.